United States Patent Office 3,098,744
Patented July 23, 1963

3,098,744
PROCESS TO TREAT FOOD PRODUCTS BY THE USE IN PRESENCE OF ANTIBIOTICS AND EITHER ANTIBIOTIC RESISTANT OR ANTIBIOTIC DEPENDENT BACTERIA STRAINS
Littoria von Lorch, Rodolfo Negri, Giuseppe Penso, and Paolo Savi, all of Rome, Italy, assignors of one-half to Fondazione Emanuele Paterno, Rome, Italy
No Drawing. Filed Apr. 8, 1960, Ser. No. 20,844
Claims priority, application Italy July 30, 1957
23 Claims. (Cl. 99—1)

This is a continuation-in-part of application Serial No. 705,092, filed December 26, 1957, now abandoned.

The present invention relates to the treatment of food products.

More particularly, this invention relates to a process for preparing sausages and prepared meats, dairy products, curdled milk, preserved fish products and the like.

The preparation of the above-mentioned products has hitherto customarily been carried out by natural fermentation. This conventional process possesses several drawbacks such as abnormal fermentations, contaminations, etc., which adversely affect the final product, the organoleptic characteristics of which are either non-constant, or not corresponding to those of the standard product.

To obviate these drawbacks, it has been attempted to improve these food products, on the one hand, by having recourse to the inoculation of the products with selected bacteria strains, and on the other hand, by using antibiotics.

Thus, for instance, in the meat industry, micrococci and lactobacilli strains have been used for the preparation of some kinds of sausages; this method is disclosed in some publications in the U.S.A. (U.S. Patent to Jensen et al.) and in Finland (Niinivaara F. P. Acta Agraria Finnica (1955)). In the dairy industry, it is customary to use lactobacilli strains, selected and rendered suitable to the specific products concerned. Lastly, the production of curdled milk (yogurt and sour milk) is tied to fermentation processes obtained by means of artificially inoculated lactobacilli or specific myceti. However, these methods also present certain inconveniences which are mainly due to the biochemical activity of contaminating micro-organisms present in the products which often prevail over those which have been artificially inoculated.

Recently, attempts have been made to take advantage of the activity of antibiotics to block the growth of the contaminating microorganisms in meats, in milk, in fish products and in their derivatives. However, this kind of treatment simultaneously blocks the activity of the micro-organisms favoring optimum fermentation and ripening of the individual products, since the inoculated micro-organisms are sensitive to the action of the antibiotics.

Furthermore, it is to be noted that apart and independently from a possible addition of antibiotic products for preservation purposes to meats, milk and their derivatives, the present extensive use of said antibiotics in the veterinary art and in cattle feeding frequently determines their presence either in meat or in milk. Where this is the case, the aforecited inconveniences will occur in a similar manner. For instance, milk obtained from cows treated with antibiotic products, or fed with antibiotic-containing substances, does not lend itself to a normal production of cheese, because the lactobacilli necessary to the fermentation process are missing since they have been destroyed by the antibiotic products fed to the cows.

According to the present invention, the simultaneous application, to the food products to be treated, of antibiotics and of selected bacteria strains, proper to the individual food products and resistant to the used antibiotics or dependent upon the latter, unexpectedly obviates the drawbacks which had been caused by the separate use of micro-organisms and of antibiotics, and the inconveniences heretofore encountered.

Very surprisingly an association of the aforesaid micro-organisms and antibiotics with each other according to the invention achieves the de-energization of the contaminating bacterial flora either present in meat, in fish products, in milk or in derivatives thereof, or introduced during the treatment according to the invention, and avoids any anomalous fermentations and adverse effects determined by said contaminating flora. This association thereby ensures the undisturbed growth of the inoculated antibiotic-resistant or antibiotic-dependent nutritionally acceptable bacteria strains and a normal development of the common fermentation processes which determine the typical organoleptic characteristics of the various resulting food products such as external appearance, color, odor, consistency and so forth, so that highly satisfactory end products are obtained.

More particularly the process, according to the invention, for preparing foodstuffs involving a fermentation in their preparation, comprises eliminating by means of antibiotics the polluting microbic flora existing in the foodstuff and inoculating thereinto bacterial strains responsible for optimum fermentation, especially nutritionally acceptable strains of the family of Lactobacteriaceae, which bacterial strains are selected from the group containing bacterial strains resistant to the antibiotic used and bacterial strains whose metabolism is dependent upon the antibiotic used; the antibiotic should have a concentration in the foodstuffs comprised in the range from about 2 to 10 microgram ($\gamma$) per gram of foodstuffs to be treated, and the bacterial strains are sprayed or similarly introduced into the foodstuffs to be treated in amounts, depending on the number of bacterial cells per volume unit of culture, which amounts are comprised in the range from about 20 to about 50 cubic centimeters (cc.) of culture per kilogram of the foodstuff to be treated, when the culture contains in the order of about $10^9$ bacterial cells per cc. of culture. The said bacterial strains have a resistance to the specific antibiotic or antibotics greater than the maximum concentration of the antibiotic or antibiotics present in the resulting food mixture. Sometimes it is necessary to use bacterial strains whose metabolism depends upon the presence of the antibiotics, instead of antibiotic-resistant micro-organims whose metabolism is independent of presence of the antibiotic, since said strains metabolize the antibiotic more quickly. This is particularly useful in products of yogurt type, the consumption of which takes place within a few days after the preparation thereof. Therefore, as there is no time to degrade antibiotic by heat or other means, it is necessary that the antibiotic be quickly metabolized by means of an antibiotic-dependent bacterial strain.

In meat products which are brought to maturation in a relatively short time, for instance 20–25 days, and without heating, it is preferable to use a concentration of about 2 to 4 micrograms of antibiotics per gram of mix, to insure that in spite of the relatively short maturation period, the antibiotic in the finished product will be completely degraded at the end of the same.

On the other hand, when the maturation of the meat products involves heating, for instance, for the purpose of cooking, a somewhat higher concentration of antibiotics of above 4 up to about $10\gamma$ per gram of mix can be employed safely, and no antibiotic will remain in the finished product.

The common degradation processes which the antibiotics undergo during the preparation treatments of the food products and which are due to cooking temperature, to pH, to enzymatic action, to duration of the production cycle and so forth, are completed by the metabolizing activity of the particular antibiotic-resistant or antibiotic-dependent bacterial mutations. Therefore, in the finished product it is no longer possible to find the introduced antibiotic present in natura, so that the inconveniences which would derive from the presence of the antibiotics in the foods such as creation of resistant bacteria strains, modification of the human bacterial flora with subsequent dysvitamin syndrome, and so forth, are avoided.

There are several modes of carrying out the process according to the invention in practice, such as:

I. The antibiotic is added to the bacterial culture in amounts of from about 40 to 400γ of antibiotic per cc. of culture, during the growth of the latter, and the resulting antibiotic-containing culture is added to a food starting material such as meat or a mixture of meat and other ingredients conventionally added in making food products such as sausages and the like, in amounts of from 20 to 50 cc. of the culture, when the latter contains about $10^9$ bacterial cells per cc., to each kilogram of the starting material, depending on the concentration of the antibiotic in the culture, so that the treated material contains from about 2 to about 4γ of antibiotic per gram.

If the treated material is then further processed at elevated temperatures, for instance by cooking, the above stated amounts of antibiotic may be increased above 4γ to about 10γ per gram of treated food material.

II. Liquid food substances such as milk which already contain antibiotics in amounts within the above-defined range of 2 to 4γ, or, if after-treatment at elevated temperatures is intended, above 4 up to 10γ, per gram of food substance or food mixture, are admixed with from about 20 to 50 cc. of the culture of a bacterial strain which is resistant to, or dependent on the respective antibiotic, per kilogram of the food substance or mixture.

III. A foodstuff such as meat is triturated repeatedly and during a first trituration antibiotic is added in the above stated amounts of from 2 to 4, or above 4 to 10γ per gram of foodstuff, and the bacterial culture is added at a subsequent trituration.

IV. In treating liquid foodstuffs which do not contain antibiotics, or which contain antibiotics only in amounts below 2γ per gram of foodstuff, sufficient antibiotic is added to attain the desired concentration within the above-stated limits, and the bacterial culture is then added as under (II) above.

The antibiotics must be degradable by the bacterial culture used within the time of processing the food up to obtaining the finished, marketable product, and are preferably selected from the group consisting of penicillin, tetracycline, oxytetracycline, chlorotetracycline, chloromycetin, streptomycin, neomycin, and the conventionally used addition salts of these antibiotics, in particular their addition salts with mineral acids. A mixture of these antibiotics such as penicillin and streptomycin may also be added.

From the explanations above, it is clear that the process according to the invention in no way modifies the normal composition of the product.

The several modes of practicing this invention are described in the examples given hereinafter, which set forth presently preferred embodiments.

The original strains used for inoculation of the culture media in these examples were obtained from the Instituto Superiore di Sanita (I.S.S.), Rome, Italy, and were resistant to antibiotics as follows:

| | |
|---|---|
| Penicillin | Up to 10 international units per cubic centimeter (u./cc.). |
| Tetracycline | Up to 200 γ/cc. |
| Chloromycetin (chloramphenicol) | Up to 200 γ/cc. |
| Streptomycin and | Up to 1,000 γ/cc. |
| Neomycin | Up to 1,000 γ/cc. |

*Example I*

A culture of *Lactobacillus acidophilus* (I.S.S.) 220 was grown in carrot-liver bouillon adjusted to a pH of 6.0, and incubated at 37° C. for 48 hours. Tetracycline hydrochloride was added to the culture at a concentration of 100γ per cc. thus rendering the strain of *L. acidophilus* artificially tetracycline resistant, at the aforesaid concentration. The growth of the culture is interrupted in a conventional manner as soon as the concentration of bacterial cells therein is in the order of $10^9$ cell per cc. of culture.

Five kilograms of meat destined for making "thick bologna" sausage according to the conventional method, were minced, and about 150 cc. of the above-described tetracycline hydrochloride-containing incubated culture were uniformly sprayed by means of an atomizer onto the minced meat, so that a final antibiotic concentration of 3γ of tetracycline hydrochloride per gram of meat is obtained. The treated meat was then mixed with salt (3.2% by weight of NaCl), spices and pieces of bacon, and stuffed into a membranous tube and finally cooked at 80 to 85° C. The finished sausage had excellent organoleptic properties.

*Example II*

Example I is repeated; however, the bacteria strain used was *Pediococcus cerevisiae* F.P.I. Pederson. Instead of 150 cc. as in the preceding example, only 100 cc. of the tetracycline hydrochloride-containing incubated culture were added to the five kilograms of minced meat so that a concentration of 2γ of tetracycline per gram of meat was obtained. The results were similar to those of the preceding example.

The test for the presence of tetracycline was carried out in the finished product according to the conventional technique of growing micro-organisms on an agar, covered plate using *Sarcina lutea* (Food and Drug Administration P.C.I. 1001) as test micro-organism.

The bacterial charges, both those introduced into the fresh minced meat and those into the finished product, were obtained by the technique of progressive dilutions and counting of the colonies growing on the plate, after a period of time of not less than 5 days. The culture medium used for this assay was a conventional agar-carrot-liver medium of pH 6.0. For isolating and identifying the antibiotic resistant strains forming the inoculum, culture media were used to which tetracycline was added, in amounts of 100 γ/cc. of culture medium, i.e. at the resistance limit of the bacterial mutation used. Under the aforesaid conditions, the bacterial charge is of the order of about $10^9$ bacterial cells per cc. of the culture medium.

The combined use of tetracycline-resistant bacterial mutations and tetracycline made it possible to prepare sausages (thick bologna sausage "SB") which at the time of use had a bacterial flora mainly constituted by that which was used in the inoculum.

The isolated strains maintained their morphological and coloring properties, and above all their resistance to tetracycline, unaltered. In the non-treated sausages a polymorphous Gram-positive flora was evidenced.

Testing for the presence of the antibiotic added to the mix gave always a negative result.

This negative result is to be ascribed partially to the action of the medium, of the cooking period and temperature, and partially to the metabolic action of the used mutation on the antibiotic.

The "SB" sausages obtained by the associated use of a tetracycline-resistant "inoculum" and of tetracycline, constantly showed, when compared to the non-treated samples, higher grade organoleptic characteristics such as better color, odor, taste, consistency, a fact which was particularly evident in the sausages obtained by an "inoculum" constituted by cultures of *Pediococcus cerevisiae* which were mutation resistant to 200 γ/cc. of tetracycline.

As far as the color is concerned, it has been noted that in the treated sausages which had been stored during about 15 days at 10° C., the slice surfaces maintained their initial characteristic pink color, while in the untreated test samples, a marked brownish discoloration appeared already after 2–3 days.

Summarizing the results of the hitherto described examples, it has been possible to obtain sausages (thick bologna sausage "SB") having all the properties of the typical product.

The net prevailing action of the tetracycline resistant "inoculum" in comparison with the contaminating flora allowed products to be obtained having constant standard characteristics as to color, odor, taste and consistency.

Furthermore, the metabolizing action of the tetracycline-resistant mutations offered additional insurance of the complete degration of the antibiotic used in the product.

There are now given further examples illustrating the various modes of practicing the invention:

Example III

Example I is repeated, however, the amount of tetracycline hydrochloride added to the culture is 200γ per cc. of culture medium; 100 cc. of the incubated culture which has thus been rendered artificially tetracycline-resistant, is added to the 5 kg. of minced meat as described in Example I so that the final antibiotic concentration is 4γ of tetracycline hydrochloride per gram of meat. The results are similar to those of the preceding examples.

The preparation of pork sausage and the like meat products according to the invention is carried out in a somewhat different mode of operation, which is described in the following examples:

Example IV

The sausage casing and the meat filling are prepared separately.

*Treatment of the casing.*—The casing is made salt-free in a conventional manner, and washed in running water and further left for several hours in running water containing tetracycline hydrochloride at a concentration of 20γ per cc. of water.

*Treatment of the sausage filling.*—5 kilograms of the meat and ingredients constituting the filling for the sausage are subjected to several, for instance two or three, triturations before being filled into the casing. During the first trituration, tetracycline hydrochloride is added at a rate of 10γ per gram of sausage ingredients.

During the next following trituration, about 200 cc. of bacterial suspension of a standard strain of *Lactobacillus helveticus* (I.S.S.) having approximately $10^9$ cells per cc. of culture medium which suspension has been prepared under the conditions as described in Example I, is sprayed by means of an atomizer onto the triturated antibiotic-containing sausage filling, and mixed thoroughly therewith. The mix is then filled into the casings and cooked for a conventional period of time. The strain of *Lactobacillus helveticus* (I.S.S.) which had been made resistant to 200γ of tetracycline per cc. of culture medium is responsible for optimum fermentation of the sausage.

Example V

Example IV is repeated with tetracycline instead of tetracycline hydrochloride. The results are similar to those obtained with Example IV.

Example VI

Example IV is repeated with chlorotetracycline instead of tetracycline hydrochloride, and with similar results.

Example VII

Example IV is repeated with *Lactobacillus lactis* (I.S.S.) instead of *L. helveticus*, and with chlorotetracycline instead of tetracycline hydrochloride. Results obtained are similar to those of Example IV. The organoleptic properties of "bologna" sausage prepared in this manner are highly satisfactory.

Example VIII

Example IV is repeated with (a) *Lactobacillus acidophilus* (I.S.S.)
(b) *Pediococcus cerevisiae* (I.S.S.)
(c) *Lactobacillus lactis* (I.S.S.)
(d) *Lactobacillus bulgaricus* (I.S.S.)
(e) *Lactobacillus casei* (I.S.S.)

and similar results are obtained.

Example IX

Similar to the procedure described in Example IV, the casing and the meat filling used in making "bologna" sausage are treated separately.

The casings are made salt-free by treatment in a conventional manner, and then washed, as described in Example IV, in running water containing streptomycin sulfate in a concentration of 50γ per cc. of water.

The meat filling is sprayed during the first trituration mentioned in Example IV, with streptomycin sulfate in amounts of 4γ per gram of meat.

In the next following trituration, 225 cc. of a culture suspension containing approximately $10^9$ cells per cc. of culture medium, of *Streptococcus lactis* (I.S.S.) which had been made resistant to 500γ of streptomycin per cc. of culture is added to 5 kilograms of the meat.

Excellent organoleptic properties were imparted to the sausage produced from this meat in accordance with the further procedure described in Example IV.

Dairy products such as cheese and yogurt are also prepared by the method according to the invention and involve the use of antibiotics and bacteria strains resistant to or dependent on certain antibiotics. Thus, milk which is obtained from cows which have previously been treated with streptomycin or penicillin, and contains traces in the order of a few micrograms or international units per cc. of milk of these antibiotics, is very well suited as starting material in the process according to the invention.

While, with the usual inocula normally formed by lactobacilli which are affected by these antibiotics, it is impossible to produce fresh cheese, butter, yogurt and so on, these products can be readily obtained if penicillin- and streptomycin-resistant lactobacilli are used. Obviously, the resistance degree of these lactobacilli must be always higher than the antibiotic concentration in the treated product. Often, the processing of milk for cheese or yogurt is not carried out in sterile surroundings and, therefore, even when pasteurized milk is used, the latter is contaminated during the various working steps with polluting germs which prevent an optimum fermentation process. By adopting the method of the invention this inconvenience is avoided by adding at the beginning of the working process antibiotics such as tetracycline, hydrochloride, oxytetracycline, chlorotetracycline in amounts of about 20 gamma per cc. of milk or streptomycin, for instance in the form of its sulfate in amounts of 50 gamma per cc. of milk and strains of lactobacilli (*Lactobacillus acidophilus, Lactobacillus helveticus, Lactobacillus bulgaricus, Streptococcus lactis*) which are resistant to the antibiotics used, and are responsible for the optimum fermentation of the product. The inoculum is formed, generally, of a bacterial suspension containing about $10^9$ cells/cc.

Example X 5 liters of a density of 1.03 grams/cc. from penicillin-treated cows, which contained 2 u. of penicillin per cc. of milk is given a streptomycin concentration of 2γ per cc. of milk by adding thereto 10 milligrams of streptomycin sulfate. A culture of *Lactobacillus casei* (I.S.S.) is prepared as described in Example I, but with an antibiotic resistance rate of 10 u. of penicillin and 200γ of streptomycin, each per cc. of culture. The bacterial suspension contains about 10⁹ cells per cc. of culture medium. 175 cc. of the culture of this streptomycin-depending strain is added to the milk.

The resulting treated milk is then further processed in a conventional manner, and, contrary to expectation, cottage cheese of excellent organoleptic properties is obtained therefrom without any difficulties.

*Example XI*

Example X is repeated with *Lactobacillus bulgaricus*, instead of *L. casei*, and the further processing of the resulting intermediate product is carried out in a conventional manner so that yogurt of excellent organoleptic properties is obtained, contrary to expectation, in spite of the antibiotic content of the initially available milk.

*Example XII*

Example X is repeated with *Lactobacillus helveticus* instead of *L. casei*, and the further processing of the resulting intermediate product is carried out in a conventional manner so that Swiss cheese of excellent organoleptic properties is obtained, contrary to expectation, in spite of the antibiotic content of the initially available milk.

*Example XIII*

Example X is repeated; however, *Streptococcus lactis* is used instead of *L. casei*. Cheese having highly satisfactory organoleptic properties is produced from the resulting milk, in spite of the fact that it is obtained from cows treated previously with penicillin and/or streptomycin, so that the lactobacilli in the untreated milk had been largely destroyed.

*Example XIV*

Example X is repeated; however, chloramphenicol is added instead of streptomycin sulfate; similar results are obtained.

By this method it has been possible to obtain from antibiotic-containing milk, as aforesaid, both yogurt and other dairy products having characteristics and yields comparable to those obtained by common milk.

The use of antibiotic resistant micro-organisms allows the metabolization of the antibiotic to be complete, so that no trace thereof is present in the finished product.

The present invention has been described with particular reference to the preparation of sausages and dairy products such as cheese and yogurt, however, it is to be understood that changes will be possible within the scope of this invention to adapt the same to the treatment of other meat products as well.

We claim:

1. In a process for preparing a finished food product selected from the group consisting of meat products and milk products, the improvement of mixing with a food consisting essentially of a member selected from the group consisting of meat and milk, (1) an antibiotic in amounts of about 2 to 10 micrograms per gram of said food, and (2) a culture of a nutritionally acceptable bacterial strain selected from the group consisting of strains resistant to said antibiotic and strains, the metabolism of which depends on the presence of said antibiotic; the culture being added in such amounts that the bacterial cell concentration in the resulting mixture corresponds to about 20 to 50 times 10⁹ cells per kilogram of said food; said antibiotic being completely degradable in the presence of said bacterial strain during the preparation of the finished food product; and fermenting the resulting mixture at least until said antibiotic is completely degraded.

2. The improvement as claimed in claim 1, wherein said antibiotic is selected from the group consisting of penicillin, tetracycline, oxytetracycline, chlorotetracycline, chloromycetin, streptomycin, neomycin, and mineral acid addition salts thereof.

3. The improvement as claimed in claim 1, wherein said antibiotic is tetracycline hydrochloride.

4. The improvement as claimed in claim 1, wherein said antibiotic is oxytetracycline.

5. The improvement as claimed in claim 1, wherein said antibiotic is chlorotetracycline.

6. The improvement as claimed in claim 1, wherein said antibiotic is streptomycin sulfate.

7. The improvement as claimed in claim 1, wherein said antibiotic is chloromycetin.

8. In a process for preparing a finished meat product, the improvement of mixing a food consisting essentially of meat with an antibiotic in amounts of about 2 to 4 micrograms per gram of said food, and a culture of a nutritionally acceptable bacterial strain selected from the group consisting of strains resistant to said antibiotic and strains, the metabolism of which depends on the presence of said antibiotic, in amounts of from 20 to 50 cc. per kilogram of food; said antibiotic being completely degradable in the presence of said bacterial strain during the preparation of the finished food product; and fermenting the resulting mixture at least until said antibiotic is completely degraded.

9. In a process for preparing a finished meat product, the improvement of adding antibiotic to the culture of a nutritionally acceptable bacterial strain resistant to said antibiotic in a ratio of about from 40 to below 1000 micrograms per cc. of culture but below the limit resistance of said strain to said antibiotic, during the growth of the latter, interrupting growth of the culture when the concentration of bacterial cells in the same is in the order of 10⁹ cells/cc., and adding the resulting antibiotic-containing culture in such amounts to a food consisting essentially of meat that the concentration of antibiotic in the food is from about 2 to 10 micrograms per gram of food, said antibiotic being completely degradable in the presence of said bacterial strain during the preparation of the finished food product; and fermenting the resulting mixture at least until said antibiotic is completely degraded.

10. In a process for preparing a finished meat product, the improvement of adding antibiotic to the culture of a nutritionally acceptable bacterial strain resistant to said antibiotic in a ratio of about from 40 to below 1000 micrograms per cc. of culture but below the limit resistance of said strain to said antibiotic, during the growth of the latter, interrupting growth of the culture when the concentration of bacterial cells in the same is in the order of 10⁹ cells/cc., and adding the resulting antibiotic-containing culture in such amounts to a food consisting essentially of meat that the concentration of antiobiotic in the food is from about 2 to 4 micrograms per gram of food, said antibiotic being completely degradable in the presence of said bacterial strain during the preparation of the finished food product; and fermenting the resulting mixture at least until said antibiotic is completely degraded.

11. In a process for preparing a finished meat product, the improvement of adding antibiotic to the culture of a nutritionally acceptable bacterial strain resistant to said antibiotic in a ratio of about from 40 to below 1000 micrograms per cc. of culture but below the limit resistance of said strain to said antibiotic, during the growth of the latter, interrupting growth of the culture when the concentration of bacterial cells in the same is in the order of 10⁹ cells/cc., and adding the resulting antibiotic-containing culture in such amounts to a food consisting essentially of meat that the concentration of antibiotic in the food is from above 4 up to about 10 micrograms per gram of food, said antibiotic being completely degradable in the presence of said bacterial strain during the preparation of the finished food product; and cooking the resulting mixture under fermentation conditions to obtain a finished product in which the antibiotic has been completely degraded.

12. The improvement claimed in claim 9, wherein the antibiotic is a tetracycline, and wherein the bacterial strain is a strain of *Lactobacillus acidophilus*.

13. The improvement claimed in claim 9, wherein the antibiotic is a tetracycline, and wherein the bacterial strain is a strain of *Pediococcus cerevisiae*.

14. In a process for preparing a finished meat product, the improvement of repeatedly triturating a food consisting essentially of meat, adding to the food during a first trituration thereof from about 2 to 10 micrograms of an antibiotic per gram of crude material, and adding to the resulting antibiotic-containing food during a subsequent trituration thereof, from about 20 to 50 cubic centimeters of a culture of a nutritionally acceptable bacterial strain resistant to said antibiotic and having a concentration of about $10^9$ bacterial cells per cc. of culture to each kilogram of food, and fermenting the resulting mixture at least until said antibiotic is completely degraded.

15. In a process for preparing a finished meat product, the improvement of repeatedly triturating a food consisting essentially of meat, adding to the food during a first trituration thereof from about 2 to 4 micrograms of an antibiotic per gram of crude material, and adding to the resulting antibiotic-containing food during a subsequent trituration thereof, from about 20 to 50 cubic centimeters of a culture of a nutritionally acceptable bacterial strain resistant to said antibiotic and having a concentration of about $10^9$ bacterial cells per cc. of culture to each kilogram of food, and fermenting the resulting mixture at least until said antibiotic is completely degraded.

16. In a process for preparing a finished meat product, the improvement of repeatedly triturating a food consisting essentially of meat, adding to the food during a first trituration thereof from above 4 up to 10 micrograms of an antibiotic per gram of crude material, and adding to the resulting antibiotic-containing food during a subsequent trituration thereof, from about 20 to 50 cubic centimeters of a culture of a bacterial strain resistant to said antibiotic and having a concentration of about $10^9$ bacterial cells per cc. of culture to each kilogram of food, said antibiotic being completely degradable in the presence of said bacterial strain during the preparation of the finished food product; and cooking the resulting mixture under fermentation conditions to obtain a finished product in which the antibiotic has been completely degraded.

17. In a process for producing a finished milk product selected from the group consisting of cheese and yogurt, from milk derived from cows previously treated with an antibiotic, the improvement of adding to milk containing said antibiotic in a concentration above 0 and up to about 50 micrograms per gram of milk, a culture of a nutritionally acceptable bacterial strain selected from the group consisting of strains resistant to said antibiotic and strains, the metabolism of which depends on the presence of said antibiotic; the culture being added in such amounts that the bacterial cell concentration in the resulting mixture corresponds to about 20 to 50 times $10^9$ bacterial cells per kilogram of milk, and fermenting the resulting mixture at least until said antibiotic is completely degraded.

18. The improvement claimed in claim 17, wherein said antibiotic is streptomycin sulfate.

19. The improvement claimed in claim 17, wherein said bacterial strain is a nutritionally acceptable strain of the family of Lactobacteriaceae.

20. The improvement claimed in claim 17, wherein said bacterial strain is a strain of *Lactobacillus helveticus*.

21. The improvement claimed in claim 17, wherein said bacterial strain is a strain of *Lactobacillus bulgaricus*.

22. The improvement in claim 17, wherein said bacterial strain is a strain of *Streptococcus lactis*.

23. The improvement claimed in claim 17, wherein said bacterial strain is a strain of *Lactobacillus casei*.

References Cited in the file of this patent

UNITED STATES PATENTS 2,950,977    Silliker et al.  ----------- Aug. 30, 1960

FOREIGN PATENTS 501,707    Canada ---------------- Apr. 20, 1954

OTHER REFERENCES

"Food Engineering," January 1953, pages 152 and 154, article entitled Antibiotic Retards Growth of Gas-Formers in Cheese.

"Food Technology," April 1953, pages 181 to 184, inclusive, article entitled, Antibiotics in Food Preservation by F. R. Leblanc et al.

"Food Technology," July 1953, pages 282 to 285, inclusive, article entitled The Complementary Action of Subtilin and Terramycin in Preserving Custard Fillings, by W. J. Godkin et al.